United States Patent
Asif Bashir et al.

(10) Patent No.: US 12,380,923 B2
(45) Date of Patent: Aug. 5, 2025

(54) MAGNETIC RECORDING HEAD WITH A CROSS-TRACK CURRENT FLOW IN A LOW RESISTANCE PATH

(71) Applicant: Western Digital Technologies, Inc., San Jose, CA (US)

(72) Inventors: Muhammad Asif Bashir, San Jose, CA (US); Yunfei Ding, Fremont, CA (US); Zhigang Bai, Fremont, CA (US); Alexander Goncharov, Morgan Hill, CA (US); Aron Pentek, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/511,235

(22) Filed: Nov. 16, 2023

(65) Prior Publication Data
US 2025/0166658 A1    May 22, 2025

(51) Int. Cl.
*G11B 5/60*  (2006.01)
*G11B 5/00*  (2006.01)

(52) U.S. Cl.
CPC .... *G11B 5/6082* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 7,212,367 B2 * | 5/2007 | Clinton | G11B 5/315 360/122 |
| 8,031,433 B2 | 10/2011 | Yan et al. | |
| 8,411,390 B2 * | 4/2013 | Franca-Neto | G11B 5/1278 360/123.06 |
| 8,724,259 B1 * | 5/2014 | Liu | G11B 5/4886 360/125.15 |
| 8,810,961 B2 | 8/2014 | Taguchi et al. | |
| 9,082,433 B1 | 7/2015 | Tang et al. | |
| 9,299,367 B1 * | 3/2016 | Tang | G11B 5/315 |
| 9,443,541 B1 * | 9/2016 | Liu | G11B 5/315 |
| 9,536,548 B1 * | 1/2017 | Narayana | G11B 5/17 |
| 9,653,101 B1 | 5/2017 | Liu et al. | |
| 10,181,334 B1 * | 1/2019 | Song | G11B 5/1278 |

(Continued)

OTHER PUBLICATIONS

T. Taguchi, K. Shimomura, A. Takeo, Stepped side shield writer for perpendicular recording, Journal of Magnetism and Magnetic Materials, vol. 320, Issue 22, 2008.

(Continued)

*Primary Examiner* — William J Klimowicz
(74) *Attorney, Agent, or Firm* — PATTERSON + SHERIDAN, LLP

(57) ABSTRACT

The present disclosure generally relates to a magnetic recording system comprising a magnetic recording head that provides a low resistance cross-track current path at the trailing side of the main pole. A bias current may be driven through the path to enhance the magnetic write field to the magnetic recording media. The current is driven by an alternating current (AC) source external to the head. In some embodiments, the cross-track current going through the low resistance path enables high amounts of current to be utilized without break down of the magnetic recording head.

21 Claims, 10 Drawing Sheets

(56) References Cited

U.S. PATENT DOCUMENTS

| | | |
|---|---|---|
| 10,276,193 B2 | 4/2019 | Narita et al. |
| 10,325,618 B1 | 6/2019 | Wu et al. |
| 10,593,355 B1* | 3/2020 | Basu ............... G11B 5/112 |
| 10,714,132 B1 | 7/2020 | Chen et al. |
| 10,741,202 B2 | 8/2020 | Ho et al. |
| 10,777,219 B1* | 9/2020 | Asif Bashir ......... G11B 5/1278 |
| 10,789,977 B1* | 9/2020 | Song ............... G11B 5/3906 |
| 10,839,828 B2 | 11/2020 | Le et al. |
| 10,839,844 B1 | 11/2020 | Asif Bashir et al. |
| 10,867,626 B1* | 12/2020 | Li ............... G11B 5/1278 |
| 10,957,348 B2* | 3/2021 | Bai ............... G11B 5/23 |
| 11,043,232 B1 | 6/2021 | Wu |
| 11,152,021 B1 | 10/2021 | Liu et al. |
| 11,276,422 B2 | 3/2022 | Le et al. |
| 11,295,766 B2 | 4/2022 | Takagishi et al. |
| 11,508,401 B1* | 11/2022 | Asif Bashir ......... G11B 5/3116 |
| 11,557,314 B1* | 1/2023 | Asif Bashir ......... G11B 5/235 |
| 11,631,423 B2 | 4/2023 | Nakagawa et al. |
| 11,636,874 B1* | 4/2023 | Tang ............... G11B 5/3146 360/313 |
| 11,854,584 B1 | 12/2023 | Asif Bashir et al. |
| 11,875,825 B1 | 1/2024 | Liu |
| 11,881,237 B1* | 1/2024 | Asif Bashir ......... G11B 5/1278 |
| 11,894,026 B1* | 2/2024 | Goncharov ......... G11B 5/3116 |
| 11,900,971 B1* | 2/2024 | Goncharov ......... G11B 5/3116 |
| 12,057,146 B1* | 8/2024 | Shi ............... G11B 5/315 |
| 2005/0280935 A1* | 12/2005 | Clinton ............... G11B 5/187 360/125.32 |
| 2007/0263324 A1 | 11/2007 | Allen et al. |
| 2012/0092787 A1 | 4/2012 | Koizumi |
| 2015/0043106 A1 | 2/2015 | Yamada et al. |
| 2022/0093123 A1 | 3/2022 | Liu et al. |
| 2022/0238135 A1 | 7/2022 | Bai et al. |
| 2023/0062839 A1 | 3/2023 | Nakagawa et al. |
| 2023/0125878 A1 | 4/2023 | Tang |
| 2024/0062776 A1 | 2/2024 | Kimura |
| 2024/0105219 A1 | 3/2024 | Koizumi |
| 2024/0355353 A1* | 10/2024 | Asif Bashir ......... G11B 5/1278 |

OTHER PUBLICATIONS

Guan, Lijie et al., "A Trailing Shield Perpendicular Writer Design With Tapered Write Gap for High Density Recording", IEEE Transactions on Magnetics, Dec. 2008, <https://www.researchgate.net/publication/224360446_A_Trailing_Shield_Perpendicular_Writer_Design_With_Tapered_Write_Gap_for_High_Density_Recording>.

* cited by examiner

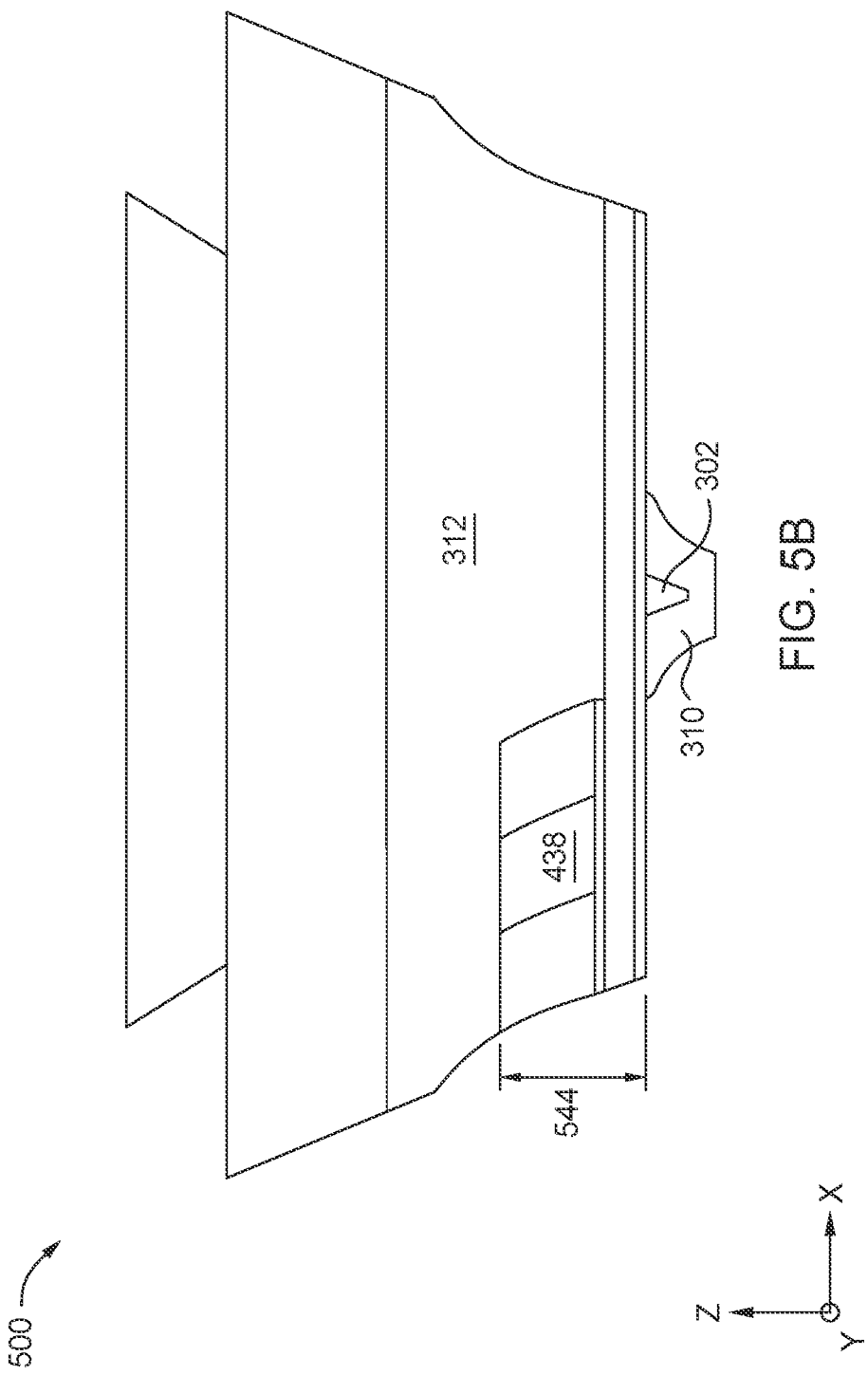

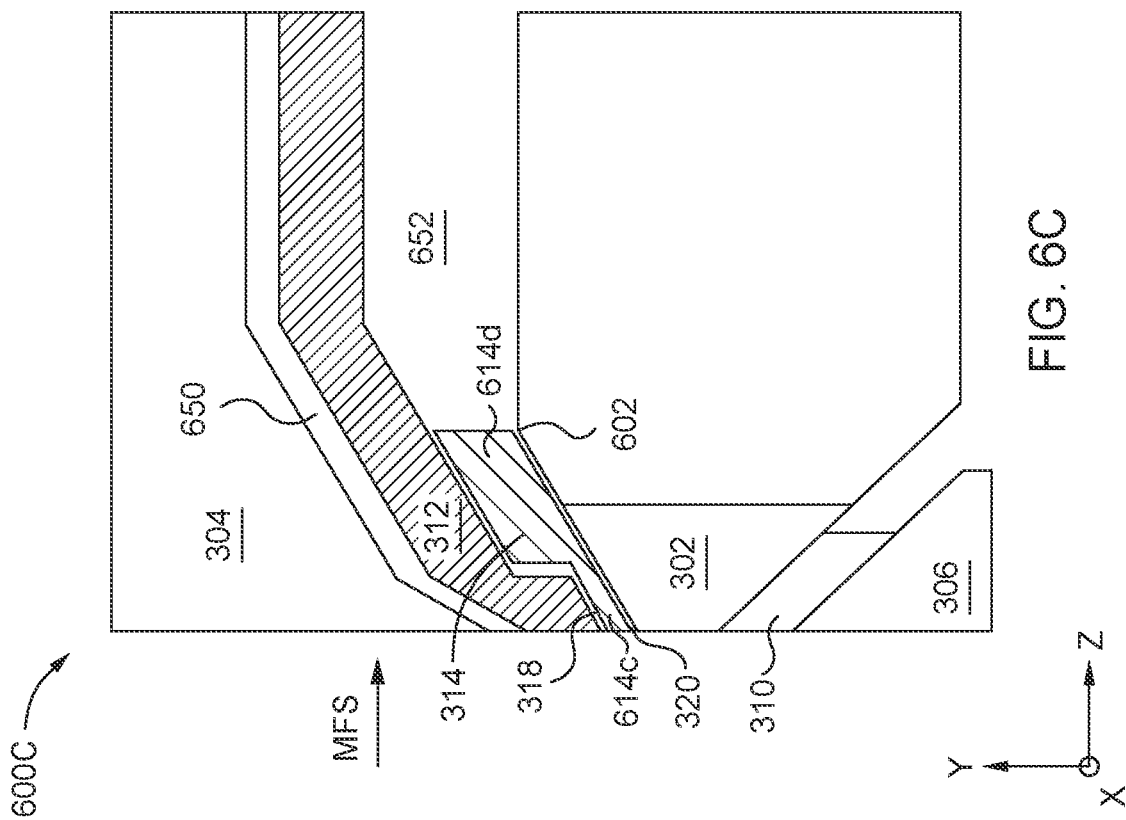
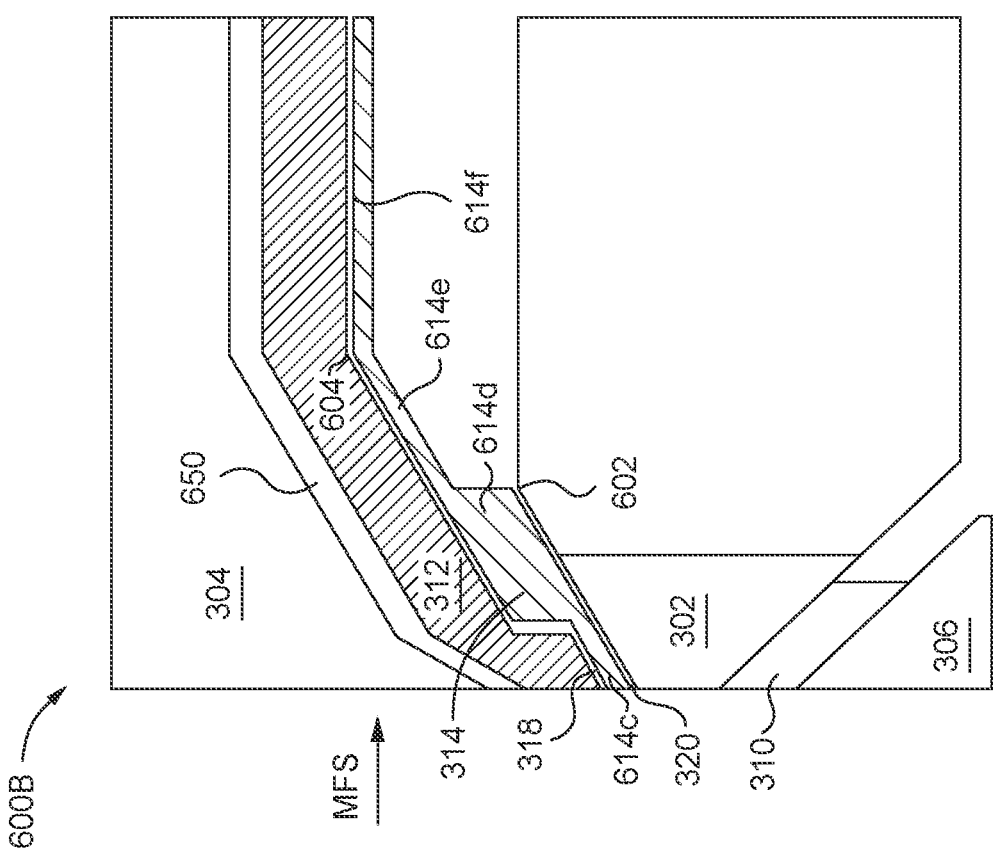

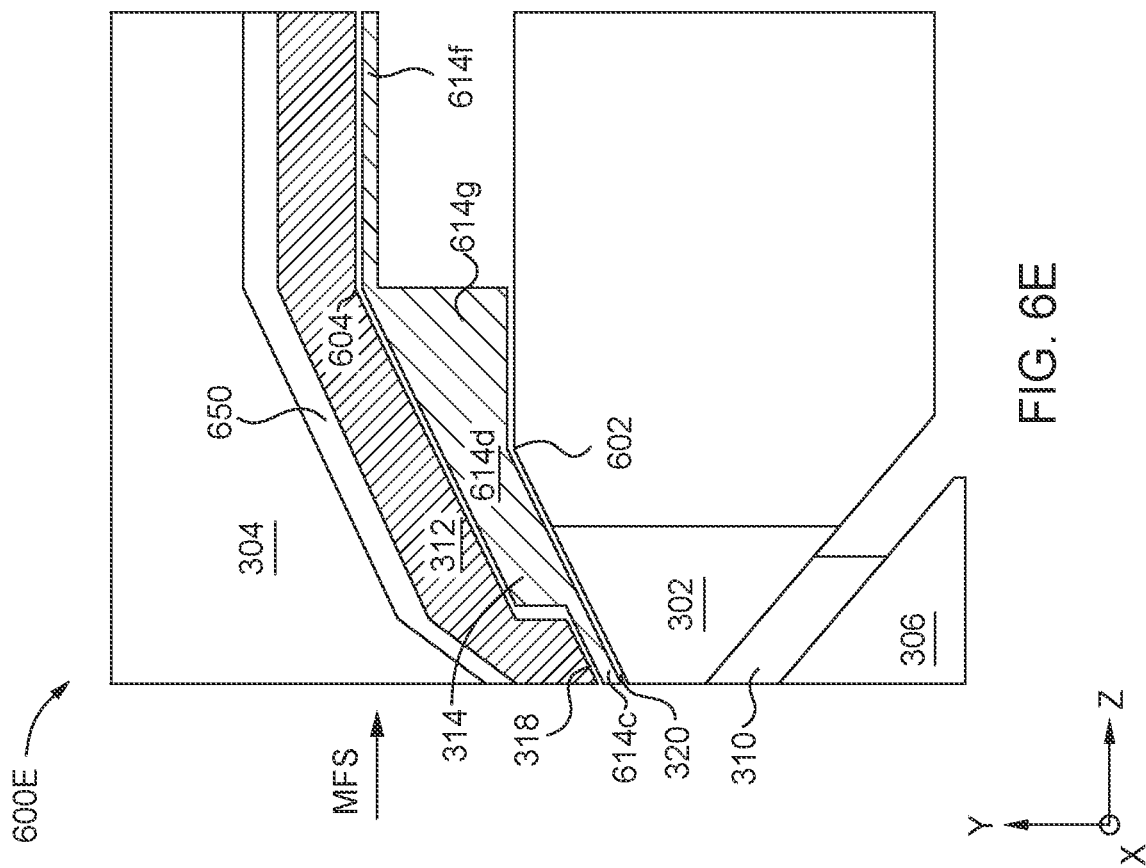
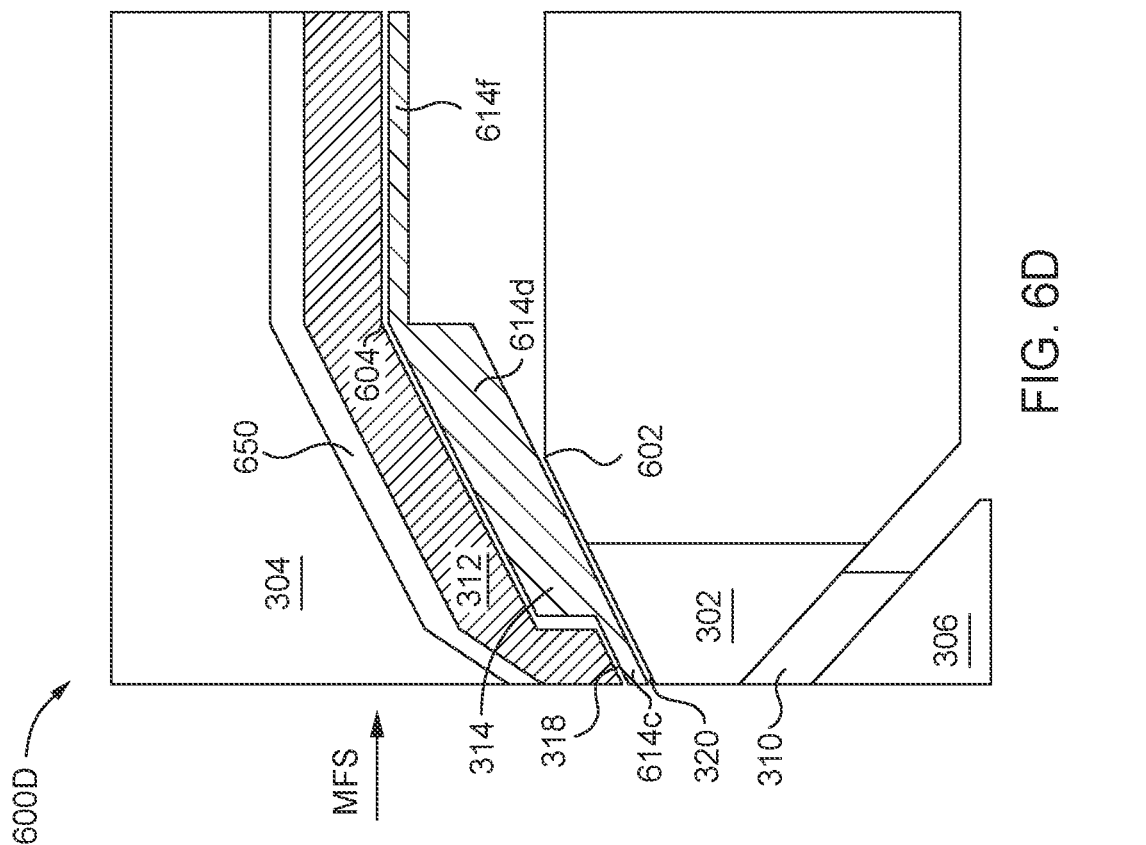

MAGNETIC RECORDING HEAD WITH A CROSS-TRACK CURRENT FLOW IN A LOW RESISTANCE PATH

BACKGROUND OF THE DISCLOSURE

Field of the Disclosure

Embodiments of the present disclosure generally relate to a magnetic recording system comprising a magnetic recording head.

Description of the Related Art

Over the past few years, various magnetic recording methods have been studied to improve the areal density of a magnetic media device, such as a hard disk drive (HDD). Magnetic recording heads, or write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, microwave-assisted magnetic recording (MAMR) is one type of energy-assisted recording technology to improve the recording density of a magnetic recording medium, such as an HDD. MAMR recording write heads may require an undesirable high voltage and/or an undesirable high current to produce a write field enhancement. A high voltage and/or high current may impact the lifetime and the reliability of the write head by degrading components of the write head, such as a tip of the write pole. Lowering the voltage or the current can hinder writer performance, lower areal density capability (ADC), and/or limit the materials used in write heads.

Therefore, there is a need in the art for an improved magnetic recording device.

SUMMARY OF THE DISCLOSURE

The present disclosure generally relates to a magnetic recording system comprising a magnetic recording head that provides a low resistance cross-track current path at the trailing side of the main pole. A bias current may be driven through the path to enhance the magnetic write field to the magnetic recording media. The current is driven by an alternating current (AC) source external to the head. In some embodiments, the cross-track current going through the low resistance path enables high amounts of current to be utilized without break down of the magnetic recording head.

The magnetic recording head with such a low resistance current path comprises a main pole disposed at a media facing surface (MFS), a trailing shield disposed over the main pole, a hot seed layer disposed between the main pole and the trailing shield at the MFS, a conductive layer disposed between the main pole and the hot seed layer at the MFS, a first blocking layer disposed at least partially between the main pole and the conductive layer, and a second blocking layer disposed between the hot seed layer and the trailing shield. In one embodiment, the hot seed layer comprises a first portion spaced from the trailing shield and a second portion disposed in contact with the trailing shield. In another embodiment, a magnetic layer is disposed in contact with the hot seed layer and the trailing shield.

In one embodiment, a magnetic recording head comprises a main pole disposed at a media facing surface (MFS), a trailing shield disposed over the main pole, a hot seed layer disposed between the main pole and the trailing shield at the MFS, the hot seed layer comprising a first portion spaced from the trailing shield and a second portion disposed in contact with the trailing shield, a conductive layer disposed between the main pole and the hot seed layer at the MFS, a first blocking layer comprising a first portion disposed between the main pole and the conductive layer, and a second blocking layer disposed between the first portion of the hot seed layer and the trailing shield.

In another embodiment, a magnetic recording head comprises a main pole disposed at a media facing surface (MFS), a trailing shield disposed over the main pole, a hot seed layer disposed between the main pole and the trailing shield at the MFS, the hot seed layer being spaced from the trailing shield, a magnetic layer disposed in contact with the hot seed layer and the trailing shield at the MFS, a conductive layer disposed between the main pole and the hot seed layer at the MFS, a first blocking layer comprising a portion disposed between the main pole and the conductive layer, and a second blocking layer disposed at least partially between the hot seed layer and the trailing shield.

In yet another embodiment, a magnetic recording head comprises a main pole disposed at a media facing surface (MFS), a trailing shield disposed over the main pole, a hot seed layer disposed between the main pole and the trailing shield at the MFS, the hot seed layer being spaced from the trailing shield, a magnetic layer disposed in contact with the hot seed layer and the trailing shield at the MFS, a conductive layer disposed between the main pole and the hot seed layer at the MFS, a first blocking layer comprising a portion disposed between the main pole and the conductive layer, and a second blocking layer comprising a portion disposed between the hot seed layer and the conductive layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5B illustrates an oblique view of the magnetic recording head of FIG. 5A, according to one embodiment.

FIGS. 6B-6E illustrate cross-sectional views of the magnetic recording head of FIG. 6A, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording system comprising a magnetic recording head that provides a low resistance cross-track current path at the trailing side of the main pole. A bias current may be driven through the path to enhance the magnetic write field to the magnetic recording media. The current is driven by an alternating current (AC) source external to the head. In some embodiments, the cross-track current going through the low resistance path enhances the write field's strength and gradient, as well as reducing jitters from magnetization reversals of the main pole.

The magnetic recording head with such a low resistance current path comprises a main pole disposed at a media facing surface (MFS), a trailing shield disposed over the main pole, a hot seed layer disposed between the main pole and the trailing shield at the MFS, a conductive layer disposed between the main pole and the hot seed layer at the MFS, a first blocking layer disposed at least partially between the main pole and the conductive layer, and a second blocking layer disposed between the hot seed layer and the trailing shield. In one embodiment, the hot seed layer comprises a first portion spaced from the trailing shield and a second portion disposed in contact with the trailing shield. In another embodiment, a magnetic layer is disposed in contact with the hot seed layer and the trailing shield.

Figure 1:
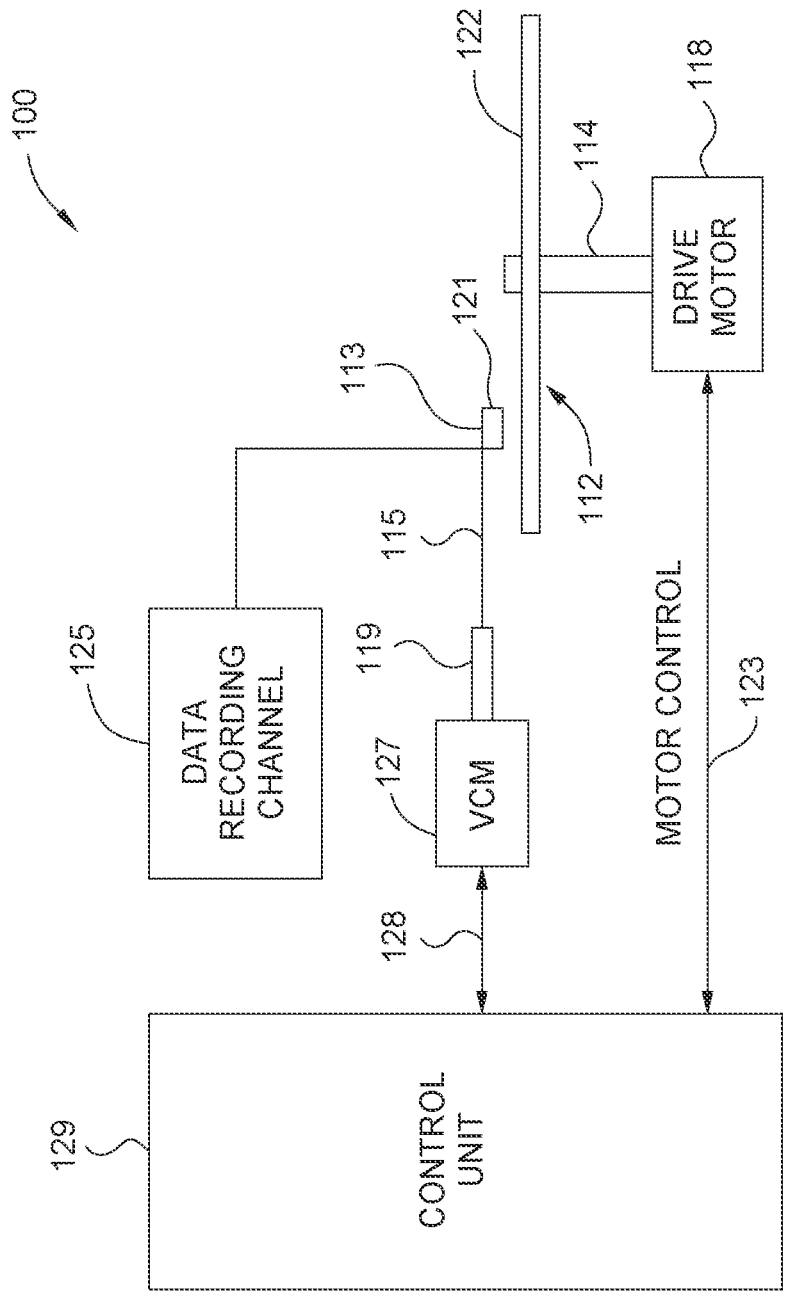
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

It is to be understood that the magnetic recording head discussed herein is applicable to a data storage device such as a hard disk drive (HDD) as well as a tape drive such as a tape embedded drive (TED) or an insertable tape media drive such as a Linear Tape Open (LTO) drive. An example TED is described in the patent titled "Tape Embedded Drive," U.S. Pat. No. 10,991,390, issued Apr. 27, 2021, assigned to the same assignee of this application. As such, any reference in the detailed description to an HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

Figure 2:
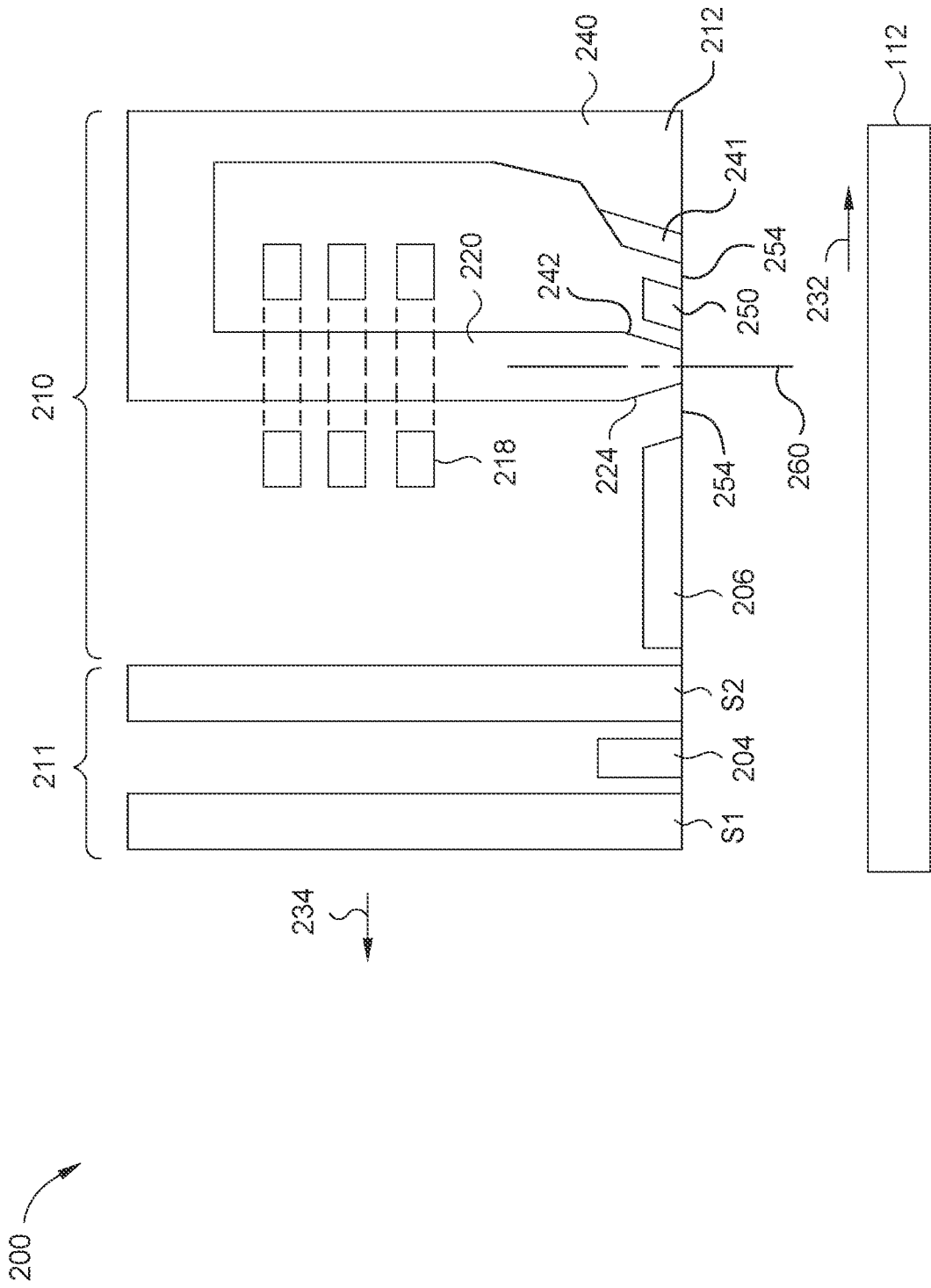
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a media facing surface (MFS) 212, such as an air bearing surface (ABS), facing the rotatable magnetic disk 112. As shown in FIG. 2, the rotatable magnetic disk 112 relatively moves in the direction indicated by the arrow 232 and the head assembly 200 relatively moves in the direction indicated by the arrow 234.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and an optional spintronic device 250 disposed between the main pole 220 and the TS 240. The main pole 220 serves as a first electrode. Each of the main pole 220, the spintronic device 250, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 224. The trailing taper 242 extends from a location recessed from the MFS 212 to the MFS 212. The leading taper 224 extends from a location recessed from the MFS 212 to the MFS 212. The trailing taper 242 and the leading taper 224 may have the same degree or different degree of taper with respect to a longitudinal axis 260 of the main pole 220. In one embodiment, which can be combined with other embodiments, the main pole 220 does not include the trailing taper 242 and the leading taper 224. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

In embodiments comprising a spintronic device 250, the spintronic device 250 is positioned proximate the main pole 220 and reduces the coercive force of the magnetic recording medium, so that smaller writing fields can be used to record data. In such embodiments, an electron current is applied to spintronic device 250 from a current source (not shown) to produce a microwave field. The electron current may include direct current (DC) waveforms, pulsed DC waveforms, and/or pulsed current waveforms going to positive and negative voltages, or other suitable waveforms. In other embodiments, an electron current is applied to spintronic device 250 from a current source to produce a high frequency alternating current (AC) field to the media.

In one embodiment comprising a spintronic device 250, which can be combined with other embodiments, the spintronic device 250 is electrically coupled to the main pole 220 and the TS 240. The current source may provide electron current to the spintronic device 250 through the main pole 220 and the TS 240. For direct current or pulsed current, the current source may flow electron current from the main pole 220 through the spintronic device 250 to the TS 240 or may flow electron current from the TS 240 through the spintronic device 250 to the main pole 220 depending on the orientation of the spintronic device 250. In one embodiment, which can be combined with other embodiments, the spintronic device 250 is coupled to electrical leads providing an electron current other than from the main pole 220 and/or the TS 240.

Figure 3:
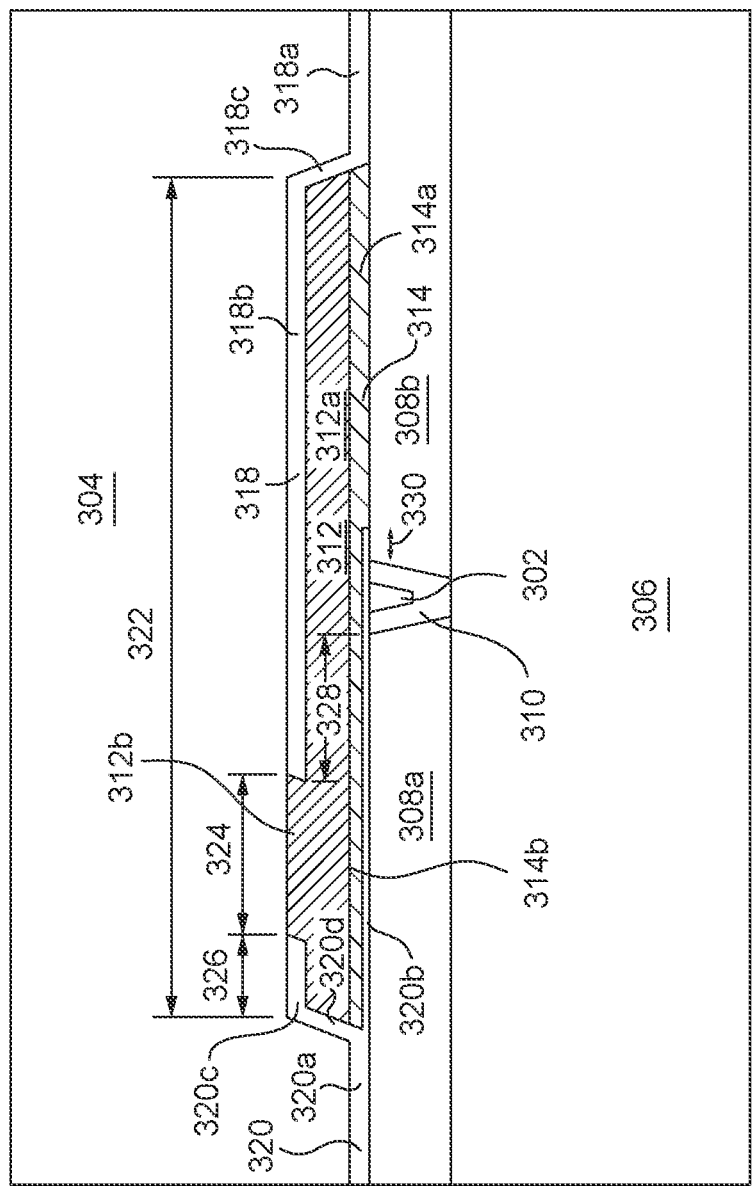
FIG. 3 illustrates a media facing surface (MFS) view of a magnetic recording head, according to one embodiment.

FIG. 3 illustrates a media facing surface (MFS) view of a magnetic recording head 300, according to one embodiment. The magnetic recording head 300 may be a part of the magnetic recording device 100 of FIG. 1. The magnetic recording head 300 may be a part of the head assembly 200 of FIG. 2, such as the write head 210.

The magnetic recording head 300 comprises a main pole (MP) 302, a trailing shield (TS) 304 disposed over the MP 302, and a leading shield (LS) 306 disposed adjacent to the MP 302. First and second side shields 308a, 308b (collectively referred to herein as side shields 308) are disposed adjacent to the MP 302 between the TS 304 and the LS 306, and side gaps 310 are disposed between the MP 302 and the side shields 308. The LS 306 is disposed in contact with the side shields 308 and the side gaps 310. A hot seed (HS) layer 312 is disposed between the MP 302 and the TS 304 such that the HS layer 312 extends over the side shields 308 in the x-direction. The HS layer 312 may be considered a part of the TS 304.

The HS layer 312 may comprise CoFe, NiFe, CoNiFe, for example. The TS 304, the LS 306, and the side shields 308 may each individually comprise NiFe, CoNiFe, and NiFeRe, and the MP 302 may comprise CoFe or CoNiFe. The side gaps 310 may comprise Ru, Cr, Ta, Cu, Au, or combinations thereof. A conductive layer 314 is disposed between the HS layer 312 and the MP 302 such that the conductive layer 314 extends over the side shields 308 in the x-direction. The conductive layer 314 may comprise Cu, Au, Ru, Cr, Ta, or combinations thereof.

The conductive layer 314 has a length 322 in the x-direction of about 0.3 μm to about 3.0 μm. The HS layer 312 comprises a first portion 312a and a second portion 312b. The first portion 312a is substantially rectangular or trapezoidal in shape, and is disposed in contact with the conductive layer 314. In some embodiments, the conductive layer 314 and first portion 312a of the HS layer 312 have a same length 322 in the x-direction. The second portion 312b has a length 324 in the x-direction of about 100 nm to about 500 nm, and is disposed in contact with the TS 304. The second portion 312b acts a bridge for current during operation, allowing the current to flow from the HS layer 312 to the TS 304. The second portion 312b is spaced a distance 328 of about 20 nm to about 150 nm from the MP 302. The first portion 312a of the HS layer 312 is spaced from the TS 304 by a first blocker layer 318 and a second blocker layer 320. The first and second blocker layers 318, 320 may each individually comprise SiN or AlOx, where x is a numeral greater than 1, for example.

The first blocker layer 318 comprises a first portion 318a disposed in contact with the second side shield 308b and the TS 304, a second portion 318b disposed in contact with the first portion 312a of the HS layer 312 and the TS 304, where the first and second portions 318a, 318b are each substantially horizontal or linear in the x-direction, and a third portion 318c connecting the first portion 318a to the second portion 318b. The third portion 318c may be substantially vertical in the y-direction, or disposed at an angle of about 0 degrees to about 65 degrees.

The second blocker layer 320 comprises a first portion 320a disposed in contact with the first side shield 308a and the TS 304, a second portion 320b disposed in contact with the conductive layer 314, the first side shield 308a, and a small portion of the second side shield 308b, a third portion 320c disposed in contact with the first portion 312a of the HS layer 312 and the TS 304, where the first, second, and third portions 320a, 320b, 320c are each substantially horizontal or linear in the x-direction, and a fourth portion 320d connecting the first portion 320a to the third portion 320c. The fourth portion 320d may be substantially vertical in the y-direction, or disposed at an angle of about 0 degrees to about 65 degrees.

The second portion 320b of the second blocker layer 320 extends over the second side shield 308b a distance 330 of about 50 nm to about 200 nm. The second portion 320b may have a width in the y-direction less than a width of each of the first, third, and fourth portions 320a, 320c, 320d. Due to the second portion 320b, the conductive layer 314 comprises a first portion 314a disposed in contact with the second side shield 308b and a second portion 314b spaced from the first side shield 308a. As such, the first portion 314a of the conductive layer 314 has a greater width in the y-direction than the second portion 314b. As discussed further below in FIGS. 6B-6E, the conductive layer 314 has a stripe height in the z-direction between about 80 nm to about 350 nm.

The third portion 320c of the second blocker layer 320 extends over the HS layer 312 a length 326 of about 50 nm to about 200 nm. Thus, the second portion 318b of the first blocker layer 318 extends over the HS layer 312 a distance of about 0.2 μm to about 2.5 μm, or the total length 322 of the conductive layer 314 minus the length 324 of the second portion 312b of the HS layer 312 (discussed above, about 100 nm to about 500 nm) and the length 326 of the third portion 320c of the second blocker layer 320.

A first lead (not shown) is disposed in contact with the LS 306 and a second lead (not shown) is disposed in contact with the TS 304. This LS-TS current path operates as follows. During operation, the MP 302 is driven by coils, such as the coils 218 of FIG. 2. Separately, a current is injected at the first lead in contact with LS 306. The current then flows through the second side shield 308b into the conductive layer 314, which first flows cross-track near the MP and then to the second portion 312b of the HS layer 312, finally exiting at the second lead in contact with the TS 304. The blocker layer 320 helps block the current from directly leaking towards the TS 304. Similarly, the first blocker layer 318 helps block the current from leaking directly from the conductive layer 314 to the TS 304. The blocker layers enable a focused cross-track flow of the current near the MP, increasing the effectiveness of the resulting assistive recording effect. As an alternative to this LS-to-TS path, other embodiments instead include a lead disposed in contact with a side shield instead of the LS. For example, a lead may be disposed in contact with the second side shield 308b, and the current may be injected there to start, with the rest of the current path to the TS lead being the same as above.

The magnetic recording head 300 is driven by an alternating current (AC) source, which is synchronized with the current applied to the main pole 302. In other words, the AC current applied to the magnetic recording head 300 and the current applied to the main pole 302 have a same frequency.

The current path of the magnetic recording head 300 reduces the lead resistance significantly, such as to about 5 ohms to about 8 ohms, as compared to conventional heads, which have a resistance of about 20 ohms to about 30 ohms. As such, the magnetic recording head 300 is able to operate at higher currents without breaking down. Since the lead resistance is reduced while still supporting high amounts of current, less heat is generated during operation, preventing the magnetic recording head 300 from breaking down, thus extending the life of the magnetic recording head 300.

Figure 4A:
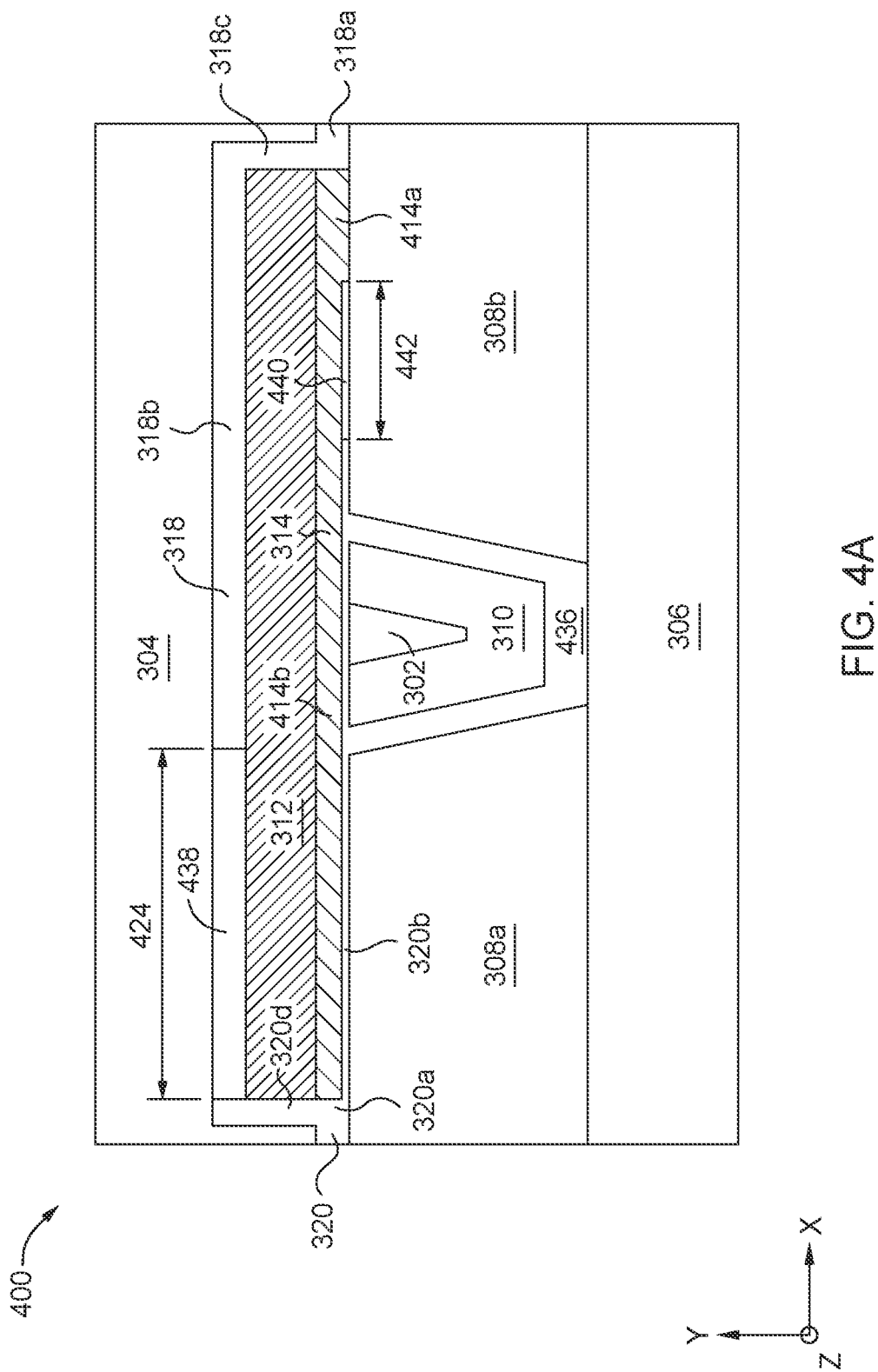
FIG. 4A illustrates an MFS view of a magnetic recording head, according to another embodiment.
Figure 4B:
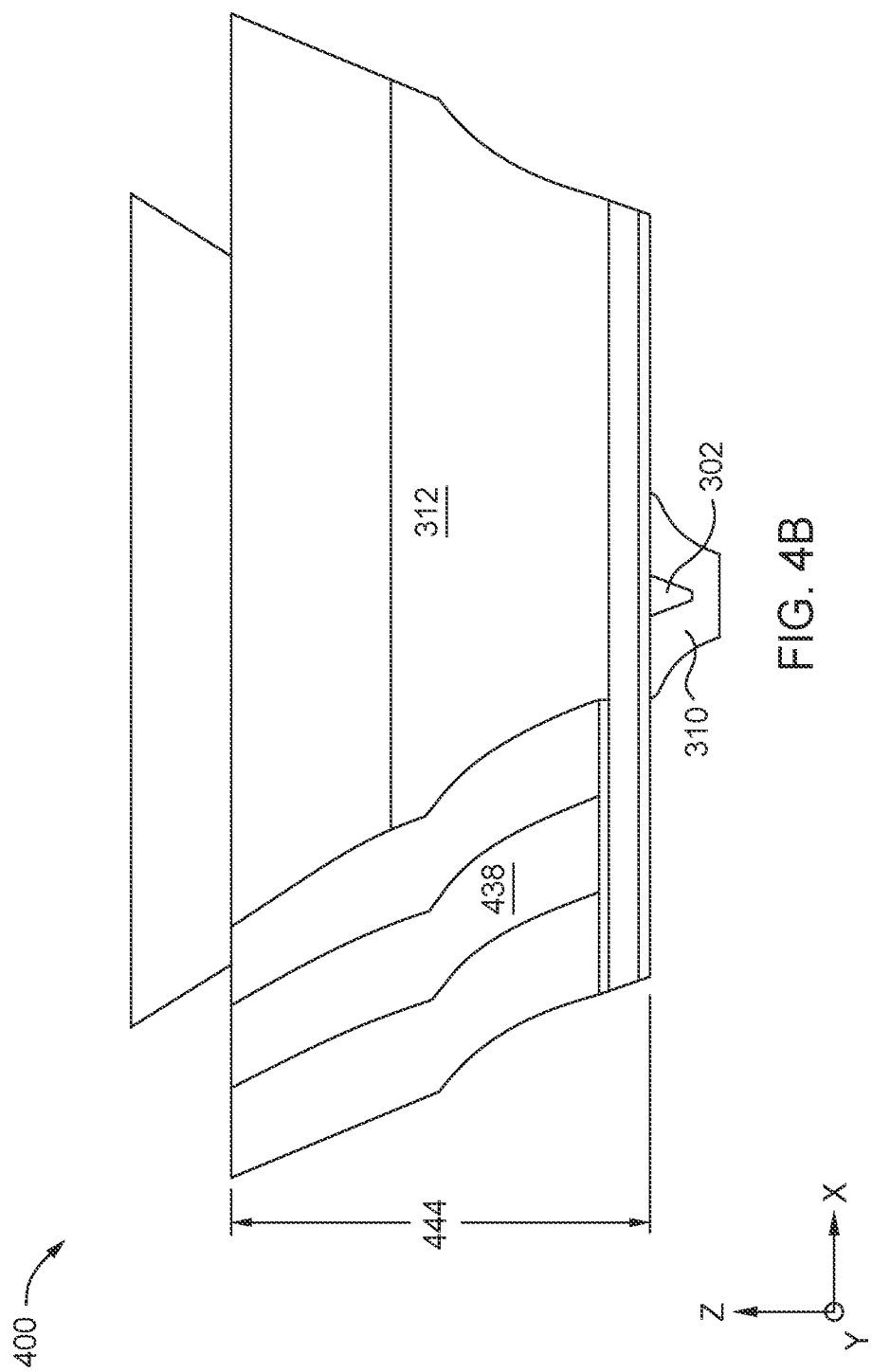
FIG. 4B illustrates an oblique view of the magnetic recording head of FIG. 4A, according to one embodiment.

FIG. 4A illustrates an MFS view of a magnetic recording head 400, according to another embodiment. FIG. 4B illustrates a cross-sectional view of the magnetic recording head 400 shown in FIG. 4A. The magnetic recording head 400 may be a part of the magnetic recording device 100 of FIG. 1. The magnetic recording head 400 may be a part of the head assembly 200 of FIG. 2, such as the write head 210. Aspects of the magnetic recording head 400 may be used in combination with the magnetic recording head 300 of FIG. 3.

The magnetic recording head 400 is similar to the magnetic recording head 300 of FIG. 3; however, the HS layer 312 comprises only one portion, and the magnetic recording head 400 further comprises a magnetic layer 438, an insulating layer 440, and an insulating layer 436. Furthermore, the second blocker layer 320 comprises only the first portion 320a disposed between the first side shield 308a and the TS 304, the second portion 320b disposed between the conductive layer 314, the first side shield 308a, the MP 302, and a portion of the second side shield 308b, and the fourth portion 320d extending in the y-direction from the first portion 320a to the TS 304. The HS layer 312 may be rectangular or trapezoidal in shape.

In the magnetic recording head 400, the insulating layer 436 is disposed between the side shields 308 and the side gap 310 such that the insulating layer 436 surrounds the side gap 310 and the MP 302. A portion of the insulating layer 436 is disposed in contact with the second portion 320b of the second blocker layer 320. The insulating layer 436 may comprise SiN or AlOx, where x is a numeral greater than 1. The magnetic layer 438 is disposed over the first side shield 308a and in contact with a portion of the HS layer 312 and a portion of the TS 304. The magnetic layer 438 has a length 424 in the x-direction of about 100 nm to about 500 nm, and may comprise NiFe, CoNiFe, NiFeRe, or CoFe. The magnetic layer 438 acts as a bridge for current during operation, allowing current to flow from the HS layer 312 to the TS 304.

The insulating layer 440 is disposed in contact with the conductive layer 314, the second side shield 308b, and the second portion 320b of the second blocker layer 320. The insulating layer 440 has a length 442 in the x-direction of about 50 nm to about 300 nm, and may comprise AlOx, where x is a numeral greater than 1, SiN, etc. Due to the insulating layer 440, the conductive layer 314 comprises a first portion 414a and a second portion 414b. The first portion 414a is disposed between the insulating layer 440 and the first blocker layer 318, and is disposed in contact with the second side shield 308b. The second portion is disposed in contact with the HS layer 312 and extends over the first side shield 308a, the MP 302, a portion of the second side shield 308b, and the insulating layer 440.

A first lead (not shown) is disposed in contact with the LS 306 and a second lead (not shown) is disposed in contact with the TS 304. This LS-TS current path operates as follows. During operation, the MP 302 is driven by coils, such as the coils 218 of FIG. 2. Separately, a current is injected at the first lead in contact with LS 306. The current then flows through the second side shield 308b into the first portion 414a of the conductive layer 314, through the second portion 4141b of the conductive layer 314 which first flows cross-track near the MP and then to the HS layer 312 and the magnetic layer 438, finally exiting at the second lead in contact with the TS 304. The blocker layer 320 helps block the current from directly leaking towards the TS 304. Similarly, the first blocker layer 318 helps block the current from leaking directly from the conductive layer 314 to the TS 304. The blocker layers enable a focused cross-track flow of the current near the MP, increasing the effectiveness of the resulting assistive recording effect. As an alternative to this LS-to-TS path, other embodiments instead include a lead disposed in contact with a side shield instead of the LS. For example, a lead may be disposed in contact with the second side shield 308b, and the current may be injected there to start, with the rest of the current path to the TS lead being the same as above.

The magnetic recording head 400 is driven by an alternating current (AC) source, which is synchronized with the current applied to the main pole 302. In other words, the AC current applied to the magnetic recording head 400 and the current applied to the main pole 302 have a same frequency.

The current path of the magnetic recording head 400 reduces the lead resistance significantly, such as to about 5 ohms to about 8 ohms, as compared to conventional heads, which have a resistance of about 20 ohms to about 30 ohms. As such, the magnetic recording head 400 is able to operate at higher currents without breaking down. Since the lead resistance is reduced while still supporting high amounts of current, less heat is generated during operation, preventing the magnetic recording head 400 from breaking down, thus extending the life of the magnetic recording head 400.

FIG. 4B illustrates an oblique view of the magnetic recording head 400, showing the throat height 444 of the magnetic layer 438, according to one embodiment. As shown in FIG. 4B, the throat height 444 of the magnetic layer 438 is substantially equal to the throat height of the HS layer 312. The throat height 444 of the magnetic layer 438 and of the HS layer 312 is about 100 nm to about 500 nm.

Figure 5A:
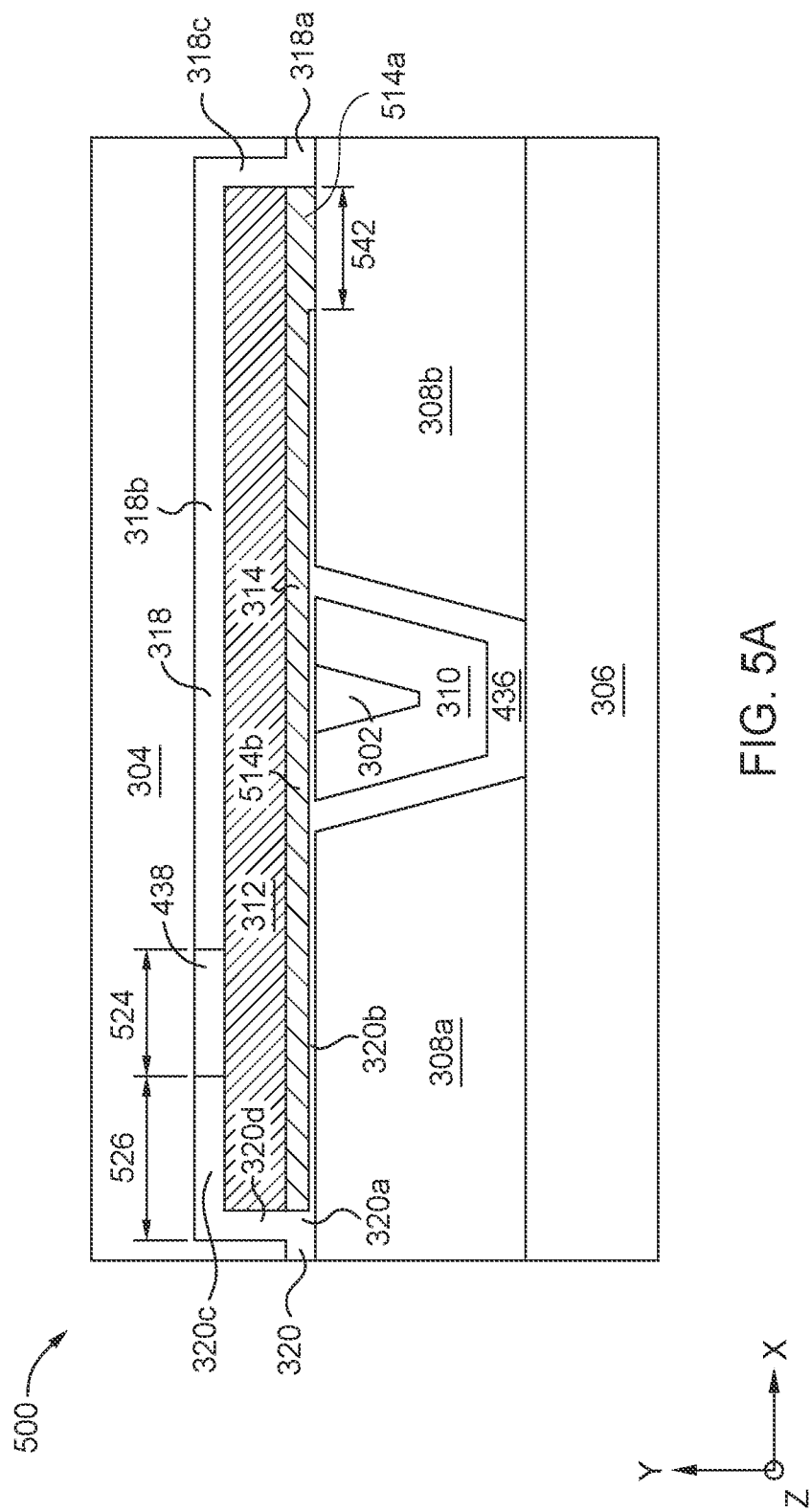
FIG. 5A illustrates an MFS view of a magnetic recording head, according to another embodiment.

FIG. 5A illustrates an MFS view of a magnetic recording head 500, according to another embodiment. FIG. 5B illustrates a cross-sectional view of the magnetic recording head 500, according to one embodiment. The magnetic recording head 500 may be a part of the magnetic recording device 100 of FIG. 1. The magnetic recording head 500 may be a part of the head assembly 200 of FIG. 2, such as the write head 210. Aspects of the magnetic recording head 500 may be used in combination with the magnetic recording head 300 of FIG. 3 and/or the magnetic recording head 400 of FIGS. 4A-4B.

The magnetic recording head 500 is similar to the magnetic recording head 400 of FIGS. 4A-4B; however, the magnetic recording head does not comprise the insulating layer 440, and the magnetic layer 438 has a length 524 in the x-direction of about 100 nm to about 500 nm. The smaller length 524 of the magnetic layer 438 increases resistance during operation. Furthermore, the second blocker layer 320 comprises the third portion 320c, similar to the magnetic recording head 300 of FIG. 3. The third portion 320c has a length 526 in the x-direction of about 50 nm to about 100 nm. The HS layer 312 may be rectangular or trapezoidal in shape.

The conductive layer 314 comprises a first portion 514a disposed in contact with the second side shield 308b and the HS layer 312, and a second portion 514b disposed between the second portion 320b of the second blocker layer 320 and the HS layer 312. The first portion 514a has a length 542 in the x-direction of about 50 nm to about 500 nm. In some embodiments, the first portion 414a of the conductive layer 314 of the magnetic recording head 400 of FIG. 4A-4B has the same length 542 in the x-direction.

A first lead (not shown) is disposed in contact with the LS 306 and a second lead (not shown) is disposed in contact with the TS 304. This LS-TS current path operates as follows. During operation, the MP 302 is driven by coils, such as the coils 218 of FIG. 2. Separately, a current is injected at the first lead in contact with LS 306. The current then flows through the second side shield 308b into the first portion 514a of the conductive layer 314, through the second portion 514b of the conductive layer 314 which first flows cross-track near the MP and then to the HS layer 312 and the magnetic layer 438, finally exiting at the second lead in contact with the TS 304. The blocker layer 320 helps block the current from directly leaking towards the TS 304. Similarly, the first blocker layer 318 helps block the current from leaking directly from the conductive layer 314 to the TS 304. The blocker layers enable a focused cross-track flow of the current near the MP, increasing the effectiveness of the resulting assistive recording effect. As an alternative to this LS-to-TS path, other embodiments instead include a lead disposed in contact with a side shield instead of the LS. For example, a lead may be disposed in contact with the second side shield 308b, and the current may be injected there to start, with the rest of the current path to the TS lead being the same as above.

The magnetic recording head 500 is driven by an alternating current (AC) source, which is synchronized with the current applied to the main pole 302. In other words, the AC current applied to the magnetic recording head 500 and the current applied to the main pole 302 have a same frequency.

The current path of the magnetic recording head 500 reduces the lead resistance significantly, such as to about 5 ohms to about 8 ohms, as compared to conventional heads, which have a resistance of about 20 ohms to about 30 ohms. As such, the magnetic recording head 500 is able to operate at higher currents without breaking down. Since the lead resistance is reduced while still supporting high amounts of current, less heat is generated during operation, preventing the magnetic recording head 500 from breaking down, thus extending the life of the magnetic recording head 500.

FIG. 5B illustrates an oblique view of the magnetic recording head 500, showing the throat height 544 of the magnetic layer 438, according to one embodiment. As shown in FIG. 5B, the throat height 544 of the magnetic layer 438 is about 80 nm. Thus, the magnetic layer 438 of the magnetic recording head 500 has a smaller throat height 544 than the magnetic layer 438 of the magnetic recording head 400 of FIGS. 4A-4B.

Figure 6A:
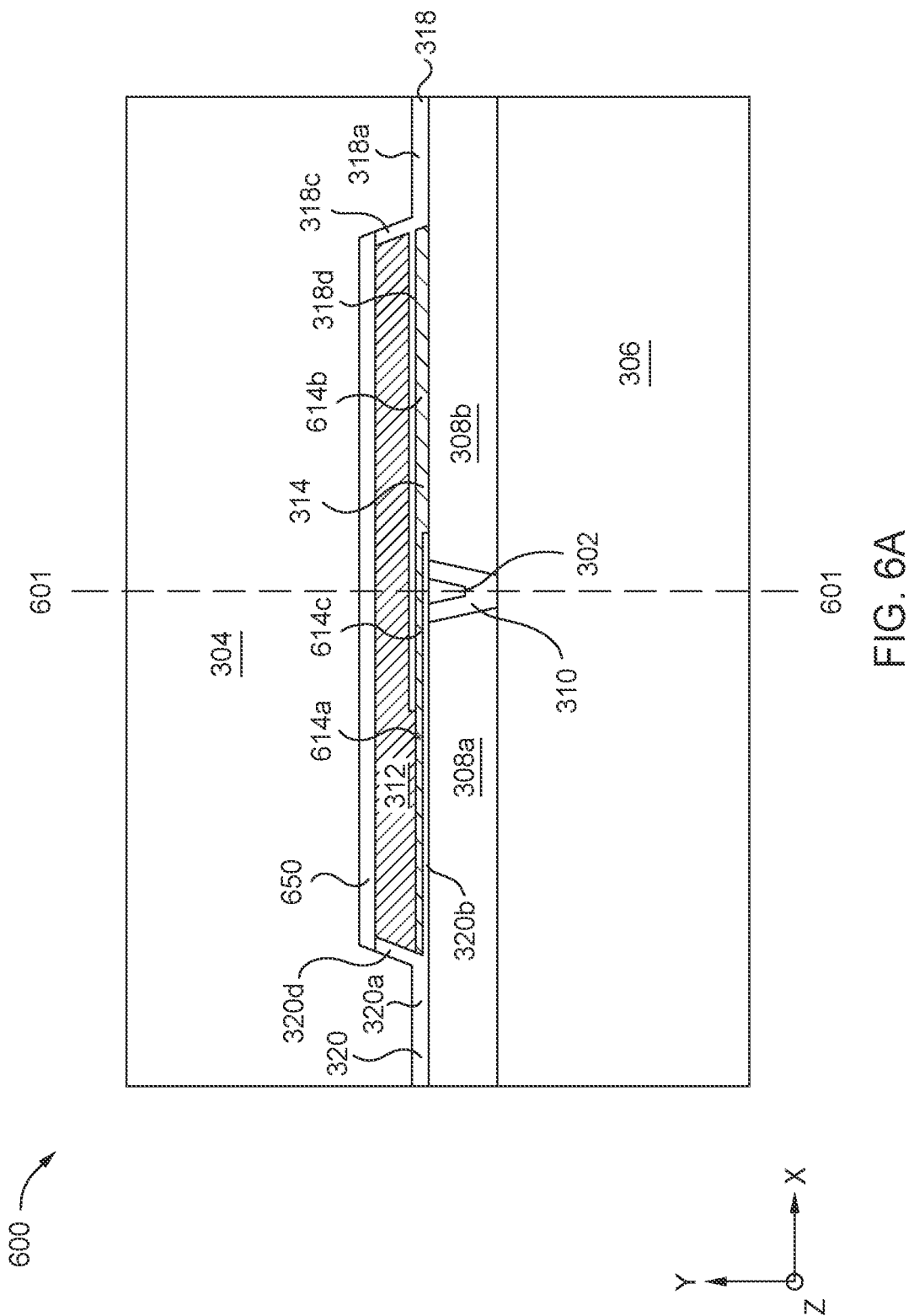
FIG. 6A illustrates an MFS view of a magnetic recording head, according to yet another embodiment.

FIG. 6A illustrates an MFS view of a magnetic recording head 600, according to another embodiment. FIGS. 6B-6E illustrate cross-sectional views through the line 601 of the magnetic recording head 600 of FIG. 6A, according to various embodiments 600B, 600C, 600D, and 600E. The magnetic recording head 600 may be a part of the magnetic recording device 100 of FIG. 1. The magnetic recording head 600 may be a part of the head assembly 200 of FIG. 2, such as the write head 210. Aspects of the magnetic recording head 600 may be used in combination with the magnetic recording head 300 of FIG. 3, the magnetic recording head 400 of FIGS. 4A-4B, and/or the magnetic recording head 500 of FIGS. 5A-5B.

The magnetic recording head 600 is similar to the magnetic recording head 500 of FIGS. 5A-5B; however, the magnetic layer 650 has a length in the x-direction greater than or equal to the HS layer 312, such as about 0.3 µm to about 3 µm, and the magnetic recording head 600 does not comprise the insulating layer 436. The magnetic layer 650 may comprise the same material as the magnetic layer 438 of the magnetic recording heads 400 and 500. The magnetic layer 650 acts a bridge for current during operation, allowing the current to flow from the HS layer 312 to the TS 304. Moreover, the first blocker layer 318 does not comprise the second portion 318*b*, and the second blocker layer 320 does not comprise the third portion 320*c*. The HS layer 312 may be substantially rectangular or trapezoidal in shape.

The first blocker layer 318 comprises a fourth portion 318*d* that extends in the x-direction between the conductive layer 314 and the HS layer 312. The fourth portion 318*d* of the first blocker layer 318 and the second portion 320*b* of the second blocker layer 320 overlap over the MP 302 such that a portion of the conductive layer 314 is disposed in contact with both the fourth portion 318*d* of the first blocker layer 318 and the second portion 320*b* of the second blocker layer 320. The conductive layer 314 comprises a first portion 614*a* disposed over the first side shield 308*a*, a second portion 614*b* disposed over the second side shield 308*b*, and a third portion 614*c* disposed over the MP 302. The first and second portions 614*a*, 614*b* have substantially the same thickness in the y-direction of about 15 nm to about 30 nm, and the third portion 614*c* has a smaller thickness in the y-direction than the first and second portions 614*a*, 614*b*, of about 15 nm to about 30 nm, as the third portion 614*c* is sandwiched between the fourth portion 318*d* of the first blocker layer 318 and the second portion 320*b* of the second blocker layer 320. The fourth portion 318*d* of the first blocker layer 318 and the second portion 320*b* of the second blocker layer 320 have a same length in the x-direction of about 0.05 µm to about 0.25 µm.

A first lead (not shown) is disposed in contact with the LS 306 and a second lead (not shown) is disposed in contact with the TS 304. This LS-TS current path operates as follows. During operation, the MP 302 is driven by coils, such as the coils 218 of FIG. 2. Separately, a current is injected at the first lead in contact with LS 306. The current then flows through the second side shield 308*b* into the second portion 614*b* of the conductive layer 314, to the first portion 614*a* of the conductive layer 314 which first flows cross-track near the MP and then to the HS layer 312 and the magnetic layer 650, finally exiting at the second lead in contact with the TS 304. The blocker layer 320 helps block the current from directly leaking towards the TS 304. Similarly, the first blocker layer 318 helps block the current from leaking directly from the conductive layer 314 to the TS 304. The blocker layers enable a focused cross-track flow of the current near the MP, increasing the effectiveness of the resulting assistive recording effect. As an alternative to this LS-to-TS path, other embodiments instead include a lead disposed in contact with a side shield instead of the LS. For example, a lead may be disposed in contact with the second side shield 308*b*, and the current may be injected there to start, with the rest of the current path to the TS lead being the same as above.

The magnetic recording head 600 is driven by an alternating current (AC) source, which is synchronized with the current applied to the main pole 302. In other words, the AC current applied to the magnetic recording head 600 and the current applied to the main pole 302 have a same frequency.

The current path of the magnetic recording head 600 reduces the lead resistance significantly, such as to about 5 ohms to about 8 ohms, as compared to conventional heads, which have a resistance of about 20 ohms to about 30 ohms. As such, the magnetic recording head 600 is able to operate at higher currents without breaking down. Since the lead resistance is reduced while still supporting high amounts of current, less heat is generated during operation, preventing the magnetic recording head 600 from breaking down, thus extending the life of the magnetic recording head 600.

FIGS. 6B-6E illustrate cross-sectional views through the line 601 of the magnetic recording head 600 of FIG. 6A, according to various embodiments 600B, 600C, 600D, and 600E. The embodiments 600B, 600C, 600D, and 600E shown in FIGS. 6B-6E, respectively, may each individually be the magnetic recording head 300 of FIG. 3, the magnetic recording head 400 of FIGS. 4A-4B, the magnetic recording head 500 of FIGS. 5A-5B, and/or the magnetic recording head 600 of FIG. 6A.

FIG. 6B illustrates a first embodiment 600B of the magnetic recording head 600. As shown, the conductive layer 314 comprises the third portion 614*c* disposed at the MFS, which is substantially rectangular in shape. A fourth portion 614*d* of the conductive layer 314 is connected to the third portion 614*c* and extends to a start of a trailing edge taper 602 of the MP 302. The fourth portion 614*d* is recessed from the MFS and has a greater thickness (i.e., of about 30 nm to about 100 nm) in the y-direction than the third portion 614*c*. The fourth portion 614*d* is substantially rectangular or rhombus in shape. A fifth portion 614*e* of the conductive layer 314 extends from the fourth portion 614*d* to a start of a trailing edge taper 604 of the HS layer 312, and is substantially rectangular in shape. A sixth portion 614*f* extends from the fifth portion 614*e* into the magnetic recording head 600 and away from the MFS, and is substantially rectangular in shape.

The fifth and sixth portions 614*e*, 614*f* are disposed adjacent to the HS layer 312, and each has a thickness in the y-direction less than the thickness of the fourth portion 614*d*. In some embodiments, the third portion 614*c*, the fifth portion 614*e*, and the sixth portion 614*f* all have a same thickness in the y-direction. The second blocker layer 320 extends between each portion 614*c*-614*f* of the conductive layer 314 and the MP 302, and the first blocker layer 318 extends between each portion 614*c*-614*f* of the conductive layer 314 and the HS layer 312. The conductive layer 314 extends away from the MFS and into the magnetic recording head 600 in the z-direction (i.e., a throat height) a distance of about 40 to about 500 nm.

FIG. 6C illustrates a second embodiment 600C of the magnetic recording head 600. In the second embodiment 600C, the conductive layer 314 comprises only the third portion 614*c* disposed at the MFS and the fourth portion 614*d* extending to the trailing edge taper 602 of the MP 302. A third blocker layer 652 is disposed behind the fourth portion 614*d*. The conductive layer 314 extends away from the MFS and into the magnetic recording head 600 in the z-direction (i.e., a throat height) a distance of about 40 nm to about 500 nm.

FIG. 6D illustrates a third embodiment 600D of the magnetic recording head 600. The third embodiment 600D is similar to the first embodiment 600B of FIG. 6B; however, the fourth portion 614*d* extends to the trailing edge taper 604 of the HS layer 312. Since the fourth portion 614*d* extends further into the magnetic recording head 600, the fifth portion 614e is not needed. The fourth portion 614d has a consistent thickness in the y-direction and may have a length in the z-direction of about 40 nm to about 500 nm. The conductive layer 314 extends away from the MFS and into the magnetic recording head 600 in the z-direction (i.e., a throat height) a distance of about 40 nm to about 500 nm.

FIG. 6E illustrates a fourth embodiment 600E of the magnetic recording head 600. The fourth embodiment 600E is similar to the first embodiment 600B of FIG. 6B; however, the conductive layer 314 comprises a seventh portion 614g coupled between the fourth portion 614d and the sixth portion 614f. The seventh portion 614g may comprise the fifth portion 614e (not shown). The seventh portion 614g has a thickness in the y-direction of about 30 nm to about 100 nm, greater than the thickness of the fourth portion 614d. The seventh portion 614g is substantially trapezoidal in shape, and extends from the trailing edge taper 602 of the MP 302 to the trailing edge taper 604 of the HS layer 312. The conductive layer 314 extends away from the MFS and into the magnetic recording head 600 in the z-direction (i.e., a throat height) a distance of about 100 nm to about 500 nm.

Therefore, by including a conductive layer between the main pole and the HS layer, and a bridge between the HS layer and the trailing shield, in a magnetic recording head, current can be directed over the main pole in a cross-track direction during operation. By directing the current over the main pole, the overall performance and lifetime of the magnetic recording head is enhanced.

In one embodiment, a magnetic recording head comprises a main pole disposed at a media facing surface (MFS), a trailing shield disposed over the main pole, a hot seed layer disposed between the main pole and the trailing shield at the MFS, the hot seed layer comprising a first portion spaced from the trailing shield and a second portion disposed in contact with the trailing shield, a conductive layer disposed between the main pole and the hot seed layer at the MFS, a first blocking layer comprising a first portion disposed between the main pole and the conductive layer, and a second blocking layer disposed between the first portion of the hot seed layer and the trailing shield.

The second portion of the hot seed layer has a length at the MFS of about 100 nm to about 500 nm, and wherein the first portion has a greater length and a greater thickness than the first portion. The magnetic recording head further comprises a first side shield disposed adjacent to the main pole, the first side shield being disposed in contact with the first blocking layer and spaced from the conductive layer, wherein the second portion of the hot seed layer is disposed over the first side shield, and a second side shield disposed adjacent to the main pole opposite to the first side shield, the second side shield being disposed in contact with the conductive layer. The first portion of the first blocking layer is additionally disposed between the conductive layer and the second side shield. The first and second blocking layers each individually comprises SiN or AlOx, where x is a numeral greater than 1. The conductive layer comprises Cu, Au, Ru, Cr, Ta, or combinations thereof. A magnetic recording device comprises the magnetic recording head.

In another embodiment, a magnetic recording head comprises a main pole disposed at a media facing surface (MFS), a trailing shield disposed over the main pole, a hot seed layer disposed between the main pole and the trailing shield at the MFS, the hot seed layer being spaced from the trailing shield, a magnetic layer disposed in contact with the hot seed layer and the trailing shield at the MFS, a conductive layer disposed between the main pole and the hot seed layer at the MFS, a first blocking layer comprising a portion disposed between the main pole and the conductive layer, and a second blocking layer disposed at least partially between the hot seed layer and the trailing shield.

The magnetic recording head further comprises a first side shield disposed adjacent to the main pole, the first side shield being disposed in contact with the first blocking layer and spaced from the conductive layer, wherein the magnetic layer is disposed over the first side shield, and a second side shield disposed adjacent to the main pole opposite to the first side shield, the second side shield being disposed in contact with a first portion of the conductive layer. The magnetic recording head further comprises a side gap disposed between the main pole and the first and second side shields, and an insulating layer disposed between the side gap and the first and second side shields, wherein the insulating layer comprises SiN or AlOx, where x is a numeral greater than 1. The magnetic recording head further comprises an insulating layer disposed in contact with the first blocking layer and the first portion of the conductive layer. The first blocking layer is disposed in contact with the first portion of the conductive layer, the first side shield, the second side shield, and the magnetic layer. The magnetic layer has a length at the MFS of about 100 nm to about 500 nm, and wherein the magnetic layer has a throat height of about 150 nm to about 500 nm. The magnetic layer has a length at the MFS of about 100 nm to about 500 nm, and wherein the magnetic layer has a throat height of about 50 nm to about 100 nm. The magnetic layer comprises NiFe, CoNiFe, NiFeRe, or CoFe, and wherein the first and second blocking layers each individually comprises SiN or AlOx, where x is a numeral greater than 1. A magnetic recording device comprises the magnetic recording head.

In yet another embodiment, a magnetic recording head comprises a main pole disposed at a media facing surface (MFS), a trailing shield disposed over the main pole, a hot seed layer disposed between the main pole and the trailing shield at the MFS, the hot seed layer being spaced from the trailing shield, a magnetic layer disposed in contact with the hot seed layer and the trailing shield at the MFS, a conductive layer disposed between the main pole and the hot seed layer at the MFS, a first blocking layer comprising a portion disposed between the main pole and the conductive layer, and a second blocking layer comprising a portion disposed between the hot seed layer and the conductive layer.

The magnetic layer has a length at the MFS greater than or equal to a length of the hot seed layer. The conductive layer has a throat height from the MFS into the magnetic recording head of about 50 nm to about 150 nm. The conductive layer has a throat height from the MFS into the magnetic recording head extending at least to a start of a trailing edge taper of the main pole. The conductive layer has a throat height from the MFS into the magnetic recording head extending at least to a start of a trailing edge taper of the hot seed layer. The conductive layer comprises a first portion extending from the MFS to a start of a trailing edge taper of the main pole, and a second portion extending from the start of the trailing edge taper of the main pole to a start of a trailing edge taper of the hot seed layer. The first portion has a greater thickness than the second portion. The first portion and the second portion have a same thickness. The conductive layer further comprises a third portion extending from the start of the trailing edge taper of the hot seed layer into the magnetic recording head.

The magnetic recording head further comprises a first side shield disposed adjacent to the main pole, the first side shield being disposed in contact with the first blocking layer and spaced from the conductive layer, and a second side shield disposed adjacent to the main pole opposite to the first side shield, the second side shield being disposed in contact with a first portion of the conductive layer, wherein the conductive layer comprises the first portion disposed in contact with the second side shield and the second blocking layer, a second portion disposed in contact with the hot seed layer and the first blocking layer, and a third portion disposed in contact with the first blocking layer and the second blocking layer. A magnetic recording device comprises the magnetic recording head.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
a main pole disposed at a media facing surface (MFS);
a trailing shield disposed over the main pole;
a hot seed layer disposed between the main pole and the trailing shield at the MFS, the hot seed layer being spaced from the trailing shield;
a magnetic layer disposed in contact with the hot seed layer and the trailing shield at the MFS;
a conductive layer disposed between the main pole and the hot seed layer at the MFS;
a first blocking layer comprising a portion disposed between the main pole and the conductive layer; and
a second blocking layer disposed at least partially between the hot seed layer and the trailing shield.

2. The magnetic recording head of claim 1, further comprising:
a first side shield disposed adjacent to the main pole, the first side shield being disposed in contact with the first blocking layer and spaced from the conductive layer, wherein the magnetic layer is disposed over the first side shield; and
a second side shield disposed adjacent to the main pole opposite to the first side shield, the second side shield being disposed in contact with a first portion of the conductive layer.

3. The magnetic recording head of claim 2, further comprising:
a side gap disposed between the main pole and the first and second side shields; and
an insulating layer disposed between the side gap and the first and second side shields, wherein the insulating layer comprises SiN or AlOx, where x is a numeral greater than 1.

4. The magnetic recording head of claim 2, further comprising an insulating layer disposed in contact with the first blocking layer and the first portion of the conductive layer.

5. The magnetic recording head of claim 2, wherein the first blocking layer is disposed in contact with the first portion of the conductive layer, the first side shield, the second side shield, and the magnetic layer.

6. The magnetic recording head of claim 1, wherein the magnetic layer has a length at the MFS of about 100 nm to about 500 nm, and wherein the magnetic layer has a throat height of about 150 nm to about 500 nm.

7. The magnetic recording head of claim 1, wherein the magnetic layer has a length at the MFS of about 100 nm to about 500 nm, and wherein the magnetic layer has a throat height of about 50 nm to about 100 nm.

8. The magnetic recording head of claim 1, wherein the magnetic layer comprises NiFe, CoNiFe, NiFeRe, or CoFe, and wherein the first and second blocking layers each individually comprises SiN or AlOx, where x is a numeral greater than 1.

9. A magnetic recording device comprising the magnetic recording head of claim 1.

10. A magnetic recording head, comprising:
a main pole disposed at a media facing surface (MFS);
a trailing shield disposed over the main pole;
a hot seed layer disposed between the main pole and the trailing shield at the MFS, the hot seed layer being spaced from the trailing shield;
a magnetic layer disposed in contact with the hot seed layer and the trailing shield at the MFS;
a conductive layer disposed between the main pole and the hot seed layer at the MFS;
a first blocking layer comprising a portion disposed between the main pole and the conductive layer; and
a second blocking layer comprising a portion disposed between the hot seed layer and the conductive layer.

11. The magnetic recording head of claim 10, wherein the magnetic layer has a length at the MFS greater than or equal to a length of the hot seed layer.

12. The magnetic recording head of claim 10, wherein the conductive layer has a throat height from the MFS into the magnetic recording head of about 50 nm to about 500 nm.

13. The magnetic recording head of claim 10, wherein the conductive layer has a throat height from the MFS into the magnetic recording head extending at least to a start of a trailing edge taper of the main pole.

14. The magnetic recording head of claim 10, wherein the conductive layer has a throat height from the MFS into the magnetic recording head extending at least to a start of a trailing edge taper of the hot seed layer.

15. The magnetic recording head of claim 10, wherein the conductive layer comprises a first portion extending from the MFS to a start of a trailing edge taper of the main pole, and a second portion extending from the start of the trailing edge taper of the main pole to a start of a trailing edge taper of the hot seed layer.

16. The magnetic recording head of claim 15, wherein the first portion has a greater thickness than the second portion.

17. The magnetic recording head of claim 15, wherein the second portion has a greater thickness than the first portion.

18. The magnetic recording head of claim 15, wherein the first portion and the second portion have a same thickness.

19. The magnetic recording head of claim 15, wherein the conductive layer further comprises a third portion extending from the start of the trailing edge taper of the hot seed layer into the magnetic recording head.

20. The magnetic recording head of claim 10, further comprising:
a first side shield disposed adjacent to the main pole, the first side shield being disposed in contact with the first blocking layer and spaced from the conductive layer; and
a second side shield disposed adjacent to the main pole opposite to the first side shield, the second side shield being disposed in contact with a first portion of the conductive layer,
wherein the conductive layer comprises the first portion disposed in contact with the second side shield and the second blocking layer, a second portion disposed in contact with the hot seed layer and the first blocking layer, and a third portion disposed in contact with the first blocking layer and the second blocking layer.

21. A magnetic recording device comprising the magnetic recording head of claim 10.

\* \* \* \* \*